(12) United States Patent
Cypher et al.

(10) Patent No.: US 10,678,647 B2
(45) Date of Patent: **\*Jun. 9, 2020**

(54) DISTRIBUTING DATA ON DISTRIBUTED STORAGE SYSTEMS

(71) Applicant: Google LLC, Mountain View, CA (US)

(72) Inventors: Robert Cypher, Saratoga, CA (US);
Sean Quinlan, Palo Alto, CA (US);
Steven Robert Schirripa, Hazlet, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,904

(22) Filed: Apr. 24, 2019

(65) Prior Publication Data

US 2019/0250992 A1 Aug. 15, 2019

Related U.S. Application Data

(63) Continuation of application No. 15/180,896, filed on Jun. 13, 2016, now Pat. No. 10,318,384, which is a (Continued)

(51) Int. Cl.
*H04L 12/00* (2006.01)
*G06F 17/00* (2019.01)
(Continued)

(52) U.S. Cl.
CPC ...... *G06F 11/1435* (2013.01); *G06F 16/1748* (2019.01); *G06F 16/182* (2019.01); *G06F 16/278* (2019.01)

(58) Field of Classification Search
CPC ............. G06F 11/1435; G06F 16/1748; G06F 16/182; G06F 16/278
(Continued)

(56) References Cited

U.S. PATENT DOCUMENTS 6,405,284 B1  6/2002  Bridge
6,553,389 B1  4/2003  Golding et al.
(Continued)

FOREIGN PATENT DOCUMENTS

JP  2008204206 A  9/2008
WO  2012173600 A1  12/2012
WO  2013142008 A1  9/2013

OTHER PUBLICATIONS

CC. Huang, M. Chen, and J. Li, "Pyramid Codes: Schemes to Trade Space for Access Effciency in Reliable Data Storage Systems," Proc. of IEEE NCA, Cambridge, MA, Jul. 2007.
(Continued)

*Primary Examiner* — Frantz Coby
(74) *Attorney, Agent, or Firm* — Honigman LLP; Brett A. Krueger

(57) ABSTRACT

A method of distributing data in a distributed storage system includes receiving a file, dividing the received file into chunks, and determining a distribution of the chunks among storage devices of the distributed storage system based on a maintenance hierarchy of the distributed storage system. The maintenance hierarchy includes maintenance levels, and each maintenance level includes one or more maintenance units. Each maintenance unit has an active state and an inactive state. Moreover, each storage device is associated with a maintenance unit. The determining of the distribution of the chunks includes identifying a random selection of the storage devices matching a number of chunks of the file and being capable of maintaining accessibility of the file when one or more maintenance units are in an inactive state. The method also includes distributing the chunks to storage devices of the distributed storage system according to the determined distribution.

24 Claims, 16 Drawing Sheets

Related U.S. Application Data continuation of application No. 14/097,380, filed on Dec. 5, 2013, now Pat. No. 9,367,562.

(51) Int. Cl.
  *G06F 11/14* (2006.01)
  *G06F 16/182* (2019.01)
  *G06F 16/27* (2019.01)
  *G06F 16/174* (2019.01)

(58) Field of Classification Search
  USPC .................................. 707/610; 709/201, 203
  See application file for complete search history.

(56) References Cited

U.S. PATENT DOCUMENTS

| | | | |
|---|---|---|---|
| 6,662,198 | B2 | 12/2003 | Satyanarayanan et al. |
| 7,159,150 | B2 | 1/2007 | Kenchammana-Hosekote et al. |
| 7,165,059 | B1 | 1/2007 | Shah et al. |
| 7,188,118 | B2 * | 3/2007 | Borthakur ................. G06F 7/02 707/693 |
| 7,536,693 | B1 | 5/2009 | Manczak et al. |
| 7,568,034 | B1 * | 7/2009 | Dulitz ................... G06F 9/5033 709/226 |
| 7,636,767 | B2 | 12/2009 | Lev-Ran et al. |
| 7,711,711 | B1 | 5/2010 | Linnell et al. |
| 7,743,275 | B1 * | 6/2010 | Tormasov ........... G06F 11/1076 714/6.12 |
| 7,778,972 | B1 | 8/2010 | Cormie et al. |
| 7,840,618 | B2 * | 11/2010 | Zhang ..................... G06F 16/10 707/827 |
| 7,930,611 | B2 | 4/2011 | Huang et al. |
| 8,055,618 | B2 * | 11/2011 | Anglin ................. G06F 16/113 707/634 |
| 8,224,935 | B1 | 7/2012 | Bandopadhyay et al. |
| 8,285,686 | B2 | 10/2012 | Kesselman |
| 8,341,457 | B2 | 12/2012 | Spry et al. |
| 8,346,824 | B1 * | 1/2013 | Lyle .................... G06F 16/1834 707/822 |
| 8,499,128 | B2 | 7/2013 | Bondurant et al. |
| 8,549,095 | B2 * | 10/2013 | Moore ................. H04L 67/104 709/213 |
| 8,615,698 | B1 | 12/2013 | Cypher |
| 8,799,413 | B2 * | 8/2014 | Taylor ................. G06F 11/1435 709/219 |
| 8,930,651 | B2 | 1/2015 | Kerns |
| 9,367,562 | B2 * | 6/2016 | Cypher ............... G06F 11/1435 |
| 9,529,540 | B1 * | 12/2016 | Rus ....................... G06F 3/0643 |
| 9,684,569 | B2 * | 6/2017 | Dolan ................... G06F 3/0608 |
| 10,318,384 | B2 * | 6/2019 | Cypher ............... G06F 11/1435 |
| 2001/0044879 | A1 * | 11/2001 | Moulton .............. G06F 3/0617 711/114 |
| 2002/0049966 | A1 | 4/2002 | Lin |
| 2003/0187853 | A1 | 10/2003 | Hensley et al. |
| 2004/0088380 | A1 | 5/2004 | Chung et al. |
| 2004/0267831 | A1 * | 12/2004 | Wong ..................... H04L 29/06 |
| 2007/0214314 | A1 | 9/2007 | Reuter |
| 2008/0270436 | A1 * | 10/2008 | Fineberg ............... G06F 16/137 |
| 2009/0287831 | A1 | 11/2009 | Nakagawa et al. |
| 2010/0064354 | A1 | 3/2010 | Irvine |
| 2011/0029729 | A1 | 2/2011 | Zwisler et al. |
| 2012/0054260 | A1 | 3/2012 | Zanger et al. |
| 2012/0096127 | A1 | 4/2012 | Moore et al. |
| 2012/0185437 | A1 | 7/2012 | Pavlov et al. |
| 2012/0191675 | A1 | 7/2012 | Kim et al. |
| 2012/0303594 | A1 | 11/2012 | Mewhinney et al. |
| 2013/0179490 | A1 | 7/2013 | Naga et al. |
| 2013/0305039 | A1 | 11/2013 | Gauda |
| 2014/0052706 | A1 * | 2/2014 | Misra .................... G06F 3/0613 707/698 |
| 2014/0201156 | A1 * | 7/2014 | Rosikiewicz ....... G06F 11/1469 707/651 |
| 2014/0250321 | A1 | 9/2014 | Wu et al. |
| 2015/0006895 | A1 | 1/2015 | Irvine |
| 2015/0089283 | A1 | 3/2015 | Kermarrec et al. |
| 2016/0299815 | A1 * | 10/2016 | Cypher ............... G06F 11/1435 |
| 2018/0107455 | A1 | 4/2018 | Psistakis |

OTHER PUBLICATIONS

Erasure Coding in Windows Azure Storage.
International Search Report and Written Opinon for related Application No. PCT/US2014/057209 dated Jan. 13, 2015.
European Search Report for Application No. 14868156.2 dated Apr. 11, 2017.
Hewitt Eben, Translated by Shinpei Otani and Takashi Kobayashi, Cassandra, JP, O'Reilly Japan, Inc., Dec. 26, 2011, 1st Edition, p. 122-123.
Japanese Office Action for the related Application No. 2016-536755 dated Jun. 13, 2017.
Japanese Office Action for the related Application No. 2018-021208 dated May 26, 2019.

* cited by examiner

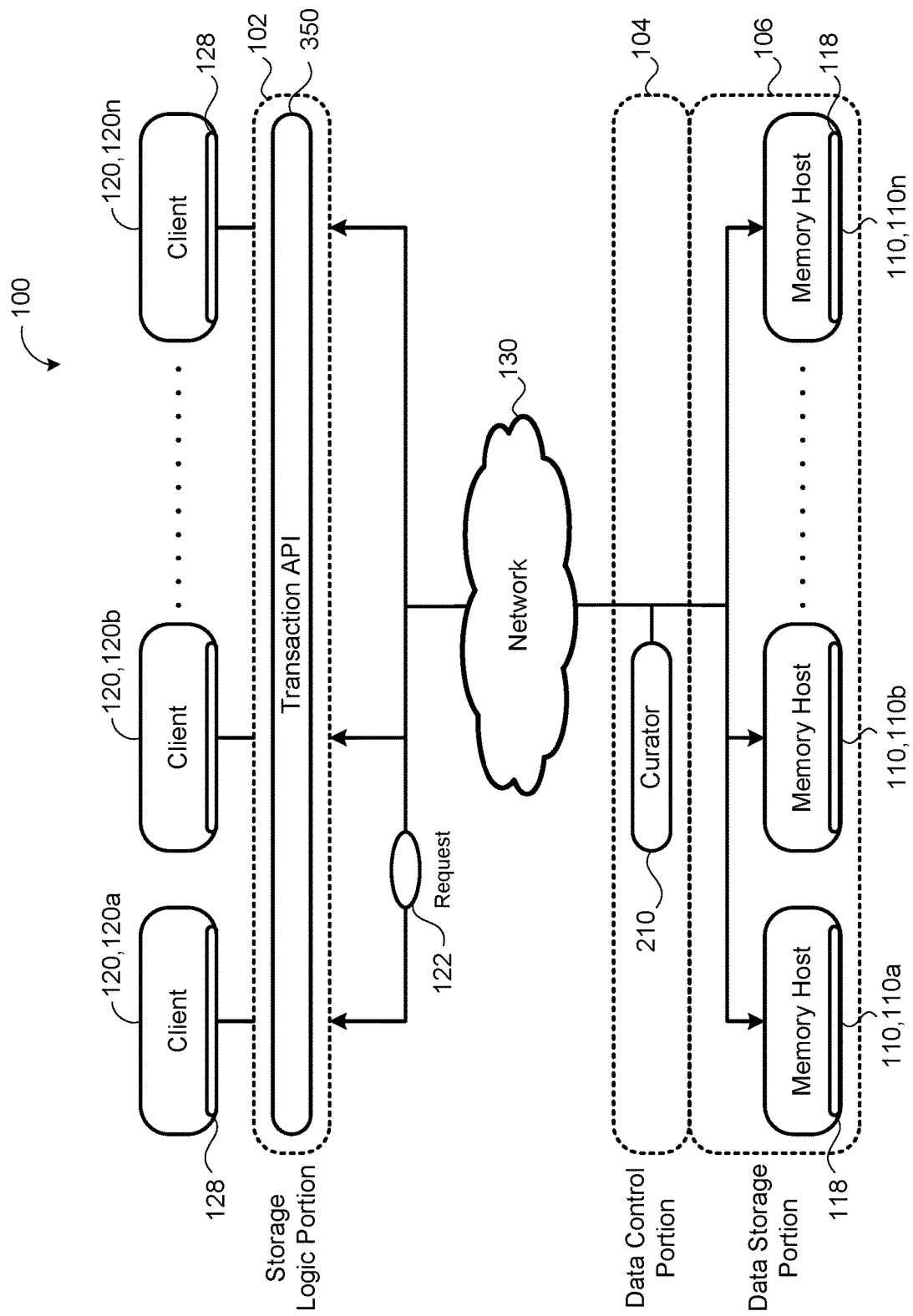

DISTRIBUTING DATA ON DISTRIBUTED STORAGE SYSTEMS

CROSS REFERENCE TO RELATED APPLICATIONS

This U.S. patent application is a continuation of, and claims priority under 35 U.S.C. § 120 from, U.S. patent application Ser. No. 15/180,896, filed on Jun. 13, 2016, which is a continuation of U.S. patent application Ser. No. 14/097,380, filed on Dec. 5, 2013. The disclosures of these prior applications are considered part of the disclosure of this application and are hereby incorporated by reference in their entireties.

TECHNICAL FIELD

This disclosure relates to distributing data on distributed storage systems.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes. Alternatively, Remote Direct Memory Access (RDMA) primitives may be used to transfer data from server hardware to client processes.

SUMMARY

One aspect of the disclosure provides a method of distributing data in a distributed storage system. The method includes receiving a file into non-transitory memory and dividing the received file into chunks using a computer processor in communication with the non-transitory memory. The method also includes distributing chunks to storage devices of the distributed storage system based on a maintenance hierarchy of the distributed storage system. The maintenance hierarchy includes maintenance units each having active and inactive states. Moreover, each storage device is associated with a maintenance unit. The chunks are distributed across multiple maintenance units to maintain accessibility of the file when a maintenance unit is in an inactive state.

Implementations of the disclosure may include one or more of the following features. In some implementations, the method further includes restricting the number of chunks distributed to storage devices of any one maintenance unit.

In some implementations, the method further includes determining a distribution of the chunks among the storage devices by determining a first random selection of storage devices that matches a number of chunks of the file and determining if the selection of storage devices is capable of maintaining accessibility of the file when one or more (or a threshold number of) maintenance units are in an inactive state. In some examples, when the first random selection of storage devices is incapable of maintaining accessibility of the file when one or more (or a threshold number of) maintenance units are in an inactive state, the method further includes determining a second random selection of storage devices that match the number of chunks of the file or modifying the first random selection of storage devices by adding or removing one or more randomly selected storage devices. The method may further include determining the first random selection of storage devices using a simple sampling, a probability sampling, a stratified sampling, or a cluster sampling.

In some implementations, the method further includes determining a distribution of the chunks among the storage devices by selecting a consecutive number of storage devices equal to a number of chunks of the file from an ordered circular list of the storage devices of the distributed storage. When the selected storage devices are collectively incapable of maintaining the accessibility of the file when one or more (or a threshold number of) maintenance units are in an inactive state, the method further includes selecting another consecutive number of storage devices from the ordered circular list equal to the number of chunks of the file. Additionally or alternatively, the method further includes determining the ordered circular list of storage devices of the distributed storage system. Adjacent storage devices on the ordered circular list are associated with different maintenance units. In some examples, a threshold number of consecutive storage devices on the ordered circular list are each associated with different maintenance units or are each in different geographical locations.

In some implementations, the method further includes determining, the maintenance hierarchy of maintenance units (e.g., using the computer processor), where the maintenance hierarchy has maintenance levels and each maintenance level includes one or more maintenance units. The method also includes mapping each maintenance unit to at least one storage device. In some examples, each maintenance unit includes storage devices powered by a single power distribution unit or a single power bus duct. Additionally or alternatively, maintenance units may include storage devices associated with a cooling unit or some other piece of equipment that needs maintenance (either sporadically or routinely).

The method may further include dividing the received file into stripes. Each file includes a replication code or an error correcting code. When the file includes a replication code, the method includes replicating at least one stripe as replication chunks. When the file includes an error correcting code, the method includes dividing at least one stripe into data chunks and code chunks. The method may also include distributing replication chunks among the storage devices differently than distributing the data chunks and the code chunks among the storage devices.

Another aspect of the disclosure provides a system for distributing data in a distributed storage system. The system includes non-transitory memory, a computer processor, and storage devices. The non-transitory memory receives one or more files from users. The computer processor communicates with the non-transitory memory and divides the received files into chunks. The storage devices communicate with the computer processor and the non-transitory memory. The computer processor stores the chunks on the storage devices based on a maintenance hierarchy of the distributed storage system. The maintenance hierarchy includes maintenance units having active and inactive states. Each storage device is associated with a maintenance unit. The computer processor distributes the chunks across multiple maintenance units to maintain accessibility of the file when a maintenance unit is in an inactive state.

In some examples, the computer processor restricts a number of chunks distributed to storage devices of any one maintenance unit. The computer processor may determine a distribution of the chunks among the storage devices by determining a first random selection of storage devices matching a number of chunks of the file and by determining if the selection of storage devices is capable of maintaining accessibility of the file when one or more (or a threshold number of) maintenance units are in an inactive state. Additionally or alternatively, the computer processor may determine a second random selection of storage devices matching the number of chunks of the file, when the first random selection of storage devices is incapable of maintaining accessibility of the file when one or more (or a threshold number of) maintenance units are in an inactive state.

In some implementations, the computer processor modifies the first random selection of storage devices by adding and removing one or more randomly selected storage devices when the first random selection of storage devices is incapable of maintaining accessibility of the file when one or more (or a threshold number of) maintenance units are in an inactive state. Additionally or alternatively, the computer processor may determine the first random selection of storage devices using a simple sampling, a probability sampling, a stratified sampling, or a cluster sampling.

In some examples, the computer processor determines a distribution of the chunks among the storage devices by selecting a consecutive number of storage devices equal to a number of chunks of the file from an ordered circular list of the storage devices of the distributed storage system. Additionally or alternatively, the computer processor may select another consecutive number of storage devices from the ordered circular list equal to the number of chunks of the file, when the selected storage devices are collectively incapable of maintaining the accessibility of the file when one or more (or a threshold number of) maintenance units are in an inactive state.

In some implementations, the computer processor determines the ordered circular list of storage devices of the distributed storage system, where adjacent storage devices on the ordered circular list are associated with different maintenance units. Additionally or alternatively, a threshold number of consecutive storage devices on the ordered circular list may each be associated with different maintenance units. Additionally or alternatively, a threshold number of consecutive storage devices on the ordered circular list may each be in different geographical locations.

In some examples, the computer processor determines a maintenance hierarchy of maintenance units and maps each maintenance unit to at least one storage device. The maintenance hierarchy has maintenance levels, with each maintenance level including one or more maintenance units. Additionally or alternatively, each maintenance unit may include storage devices powered by a single power distribution unit or a single power bus duct.

In some implementations, the computer processor divides the received file into stripes, with each file including a replication code and/or an error correcting code. When the file includes a replication code, the computer processor replicates at least one stripe as replication chunks. When the file includes an error correcting code, the computer processor divides at least one stripe into data chunks and code chunks. Additionally or alternatively, the computer processor may replicate chunks among the storage devices differently than distributing the data chunks and the code chunks among the storage devices.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is a schematic view of an exemplary distributed storage system.

Like reference symbols in the various drawings indicate like elements.

DETAILED DESCRIPTION

Figure 1B:
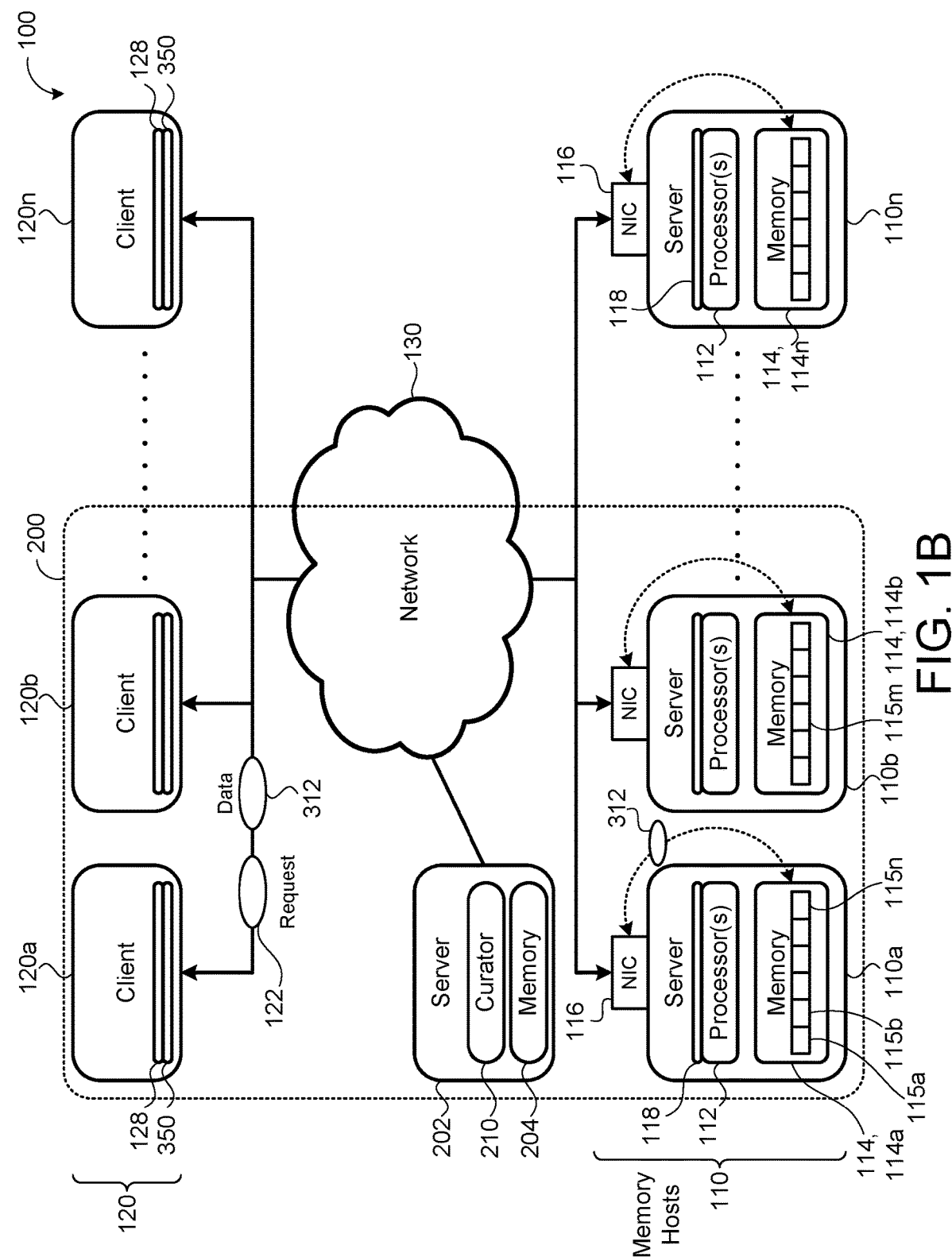
FIG. 1B is a schematic view of an exemplary distributed storage system having a cell of memory hosts managed by a curator.
Figure 1C:
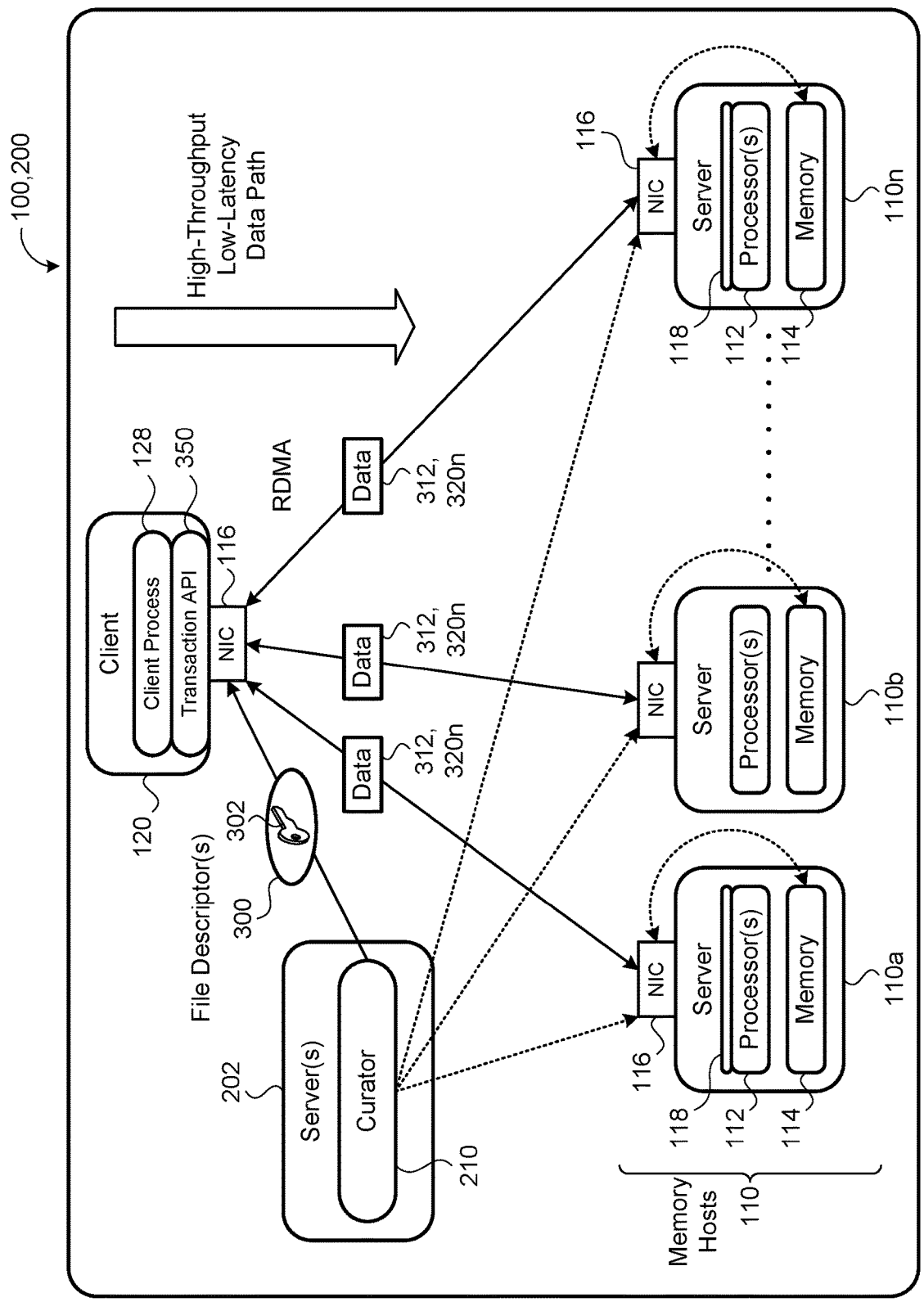
FIG. 1C is a schematic view of an exemplary cell of a distributed storage system.

Storage systems include multiple layers of redundancy where data is replicated and stored in multiple data centers. Data centers house computer systems and their associated components, such as telecommunications and storage systems 100 (FIGS. 1A-1C). Data centers usually include backup power supplies, redundant communications connections, environmental controls (to maintain a constant temperature), and security devices. Data centers may be large industrial scale operations that use a great amount of electricity (e.g., as much as a small town). Data may be located in different geographical locations (e.g., different cities, different country, and different continents). In some examples, the data centers, or a portion thereof, requires maintenance (e.g., due to a power outage or disconnecting a portion of the storage system for replacing parts, or a system failure, or a combination thereof). The data stored in these data centers may be unavailable to users during the maintenance period resulting in the impairment or halt of a user's operations. Therefore, it is desirable to provide a distributed storage system 100 where a user is capable of retrieving stored data despite the storage system 100 or portions thereof undergoing maintenance.

Referring to FIGS. 1A-1C, in some implementations, a distributed storage system 100 includes loosely coupled memory hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120a-n. The clients 120 may communicate with the memory hosts 110 through a network 130 (e.g., via RPC).

In some implementations, the distributed storage system 100 is "single-sided," eliminating the need for any server jobs for responding to remote procedure calls (RPC) from clients 120 to store or retrieve data 312 on their corresponding memory hosts 110 and may rely on specialized hardware to process remote requests 122 instead. "Single-sided" refers to the method by which most of the request processing on the memory hosts 110 may be done in hardware rather than by software executed on CPUs 112 of the memory hosts 110. Rather than having a processor 112 of a memory host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the memory host 110. In other words, a client process 128 executing on a client 120 may directly interface with one or more storage resources 114 without requiring execution of a routine of any server processes 118 executing on the computing resources 112. This single-sided distributed storage architecture offers relatively high-throughput and low latency, since clients 120 can access the storage resources 114 without interfacing with the computing resources 112 of the memory hosts 110. This has the effect of decoupling the requirements for storage 114 and CPU cycles that typical two-sided distributed storage systems 100 carry. The single-sided distributed storage system 100 can utilize remote storage resources 114 regardless of whether there are spare CPU cycles on that memory host 110; furthermore, since single-sided operations do not contend for server CPU 112 resources, a single-sided system can serve cache requests 122 with very predictable, low latency, even when memory hosts 110 are running at high CPU utilization. Thus, the single-sided distributed storage system 100 allows higher utilization of both cluster storage 114 and CPU resources 112 than traditional two-sided systems, while delivering predictable, low latency.

In some implementations, the distributed storage system 100 includes a storage logic portion 102, a data control portion 104, and a data storage portion 106. The storage logic portion 102 may include a transaction application programming interface (API) 350 (e.g., a single-sided transactional system client library) that is responsible for accessing the underlying data, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the memory hosts 110, handling errors in case of machine failures, etc. The data storage portion 106 may include the loosely coupled memory hosts 110, 110a-n.

The distributed storage system 100 may store data 312 in dynamic random access memory (DRAM) 114 and serve the data 312 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130. Both the memory hosts 110a-n and the client 120 may each have a network interface controller 116 for network communications. A host process 118 executing on the computing processor 112 of the memory host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the memory host 110 creates a client key 321 for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 350 translates commands, such as look-up or insert data commands, into sequences of primitive network interface controller operations. The transaction API 350 interfaces with the data control and data storage portions 104, 106 of the distributed storage system 100.

The distributed storage system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding memory hosts 110.

Referring to FIGS. 1B and 1C, in some implementations, the distributed storage system 100 includes multiple cells 200, each cell 200 including memory hosts 110 and a curator 210 in communication with the memory hosts 110. The curator 210 (e.g., process) may execute on a computing processor 202 (e.g., server having a non-transitory memory 204) connected to the network 130 and manage the data storage (e.g., manage a file system stored on the memory hosts 110), control data placements, and/or initiate data recovery. Moreover, the curator 210 may track an existence and storage location of data 312 on the memory hosts 110. Redundant curators 210 are possible. In some implementations, the curator(s) 210 track the striping of data 312 across multiple memory hosts 110 and the existence and/or location of multiple copies of a given stripe for redundancy and/or performance. In computer data storage, data striping is the technique of segmenting logically sequential data 312, such as a file 310 (FIG. 2), in a way that accesses of sequential segments are made to different physical storage devices 114 (e.g., cells 200 and/or memory hosts 110). Striping is useful when a processing device requests access to data 312 more quickly than a storage device 114 can provide access. By performing segment accesses on multiple devices, multiple segments can be accessed concurrently. This provides more data access throughput, which avoids causing the processor to idly wait for data accesses.

In some implementations, the transaction API 350 interfaces between a client 120 (e.g., with the client process 128) and the curator 210. In some examples, the client 120 communicates with the curator 210 through one or more remote procedure calls (RPC). In response to a client request 122, the transaction API 350 may find the storage location of certain data 312 on memory host(s) 110 and obtain a key 302 that allows access to the data 312. The transaction API 350 communicates directly with the appropriate memory hosts 110 (via the network interface controllers 116) to read or write the data 312 (e.g., using remote direct memory access). In the case that a memory host 110 is non-operational, or the data 312 was moved to a different memory host 110, the client request 122 fails, prompting the client 120 to re-query the curator 210.

Figure 2:
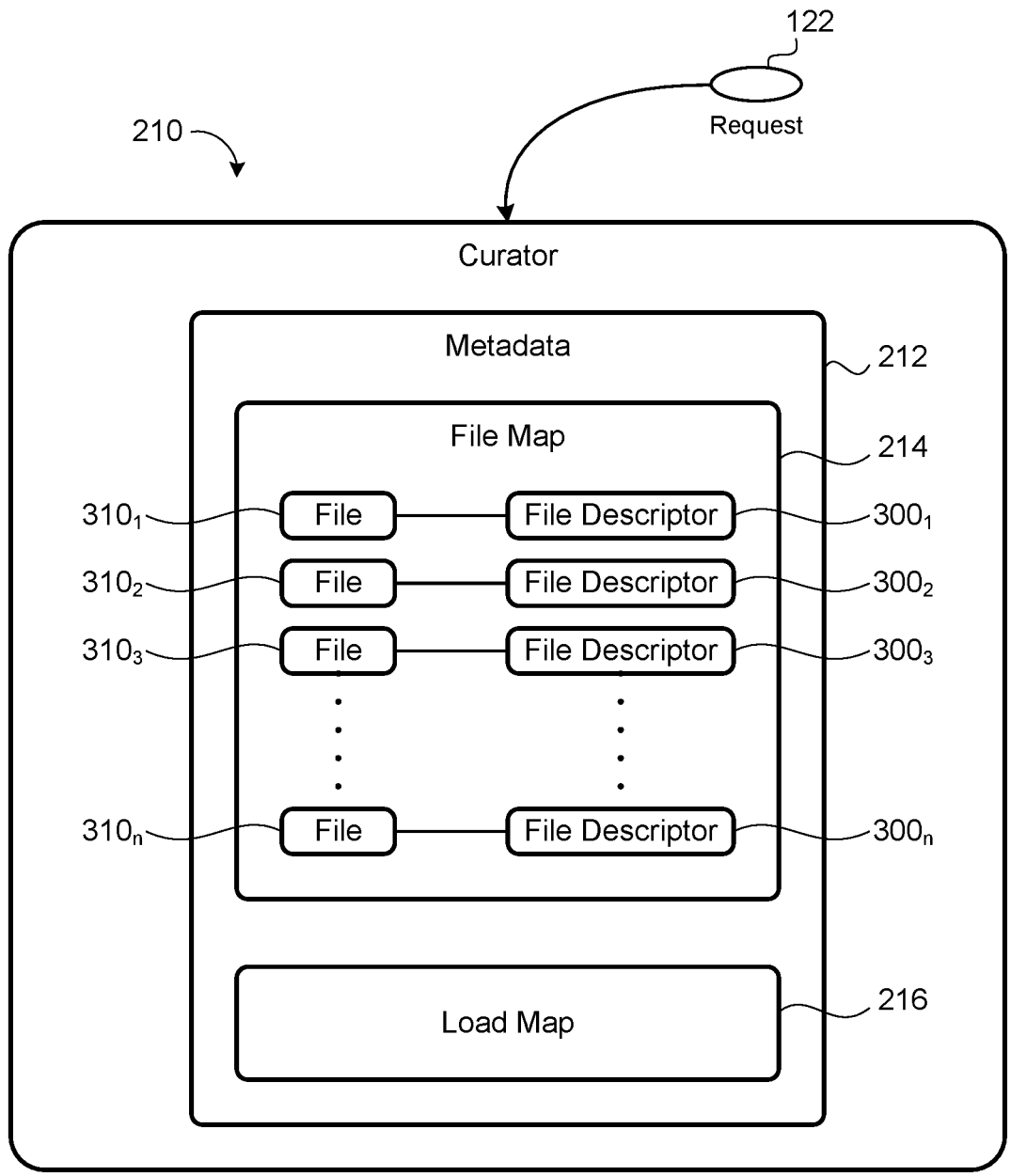
FIG. 2 is a schematic view of an exemplary curator for a distributed storage system.

Referring to FIG. 2, in some implementations, the curator 210 stores and manages file system metadata 212. The metadata 212 may include a file map 214 that maps files $310_{1-n}$ to file descriptors $300_{1-n}$. The curator 210 may examine and modify the representation of its persistent metadata 212. The curator 210 may use three different access patterns for the metadata 212: read-only, file transactions, and stripe transactions.

Figure 3A:
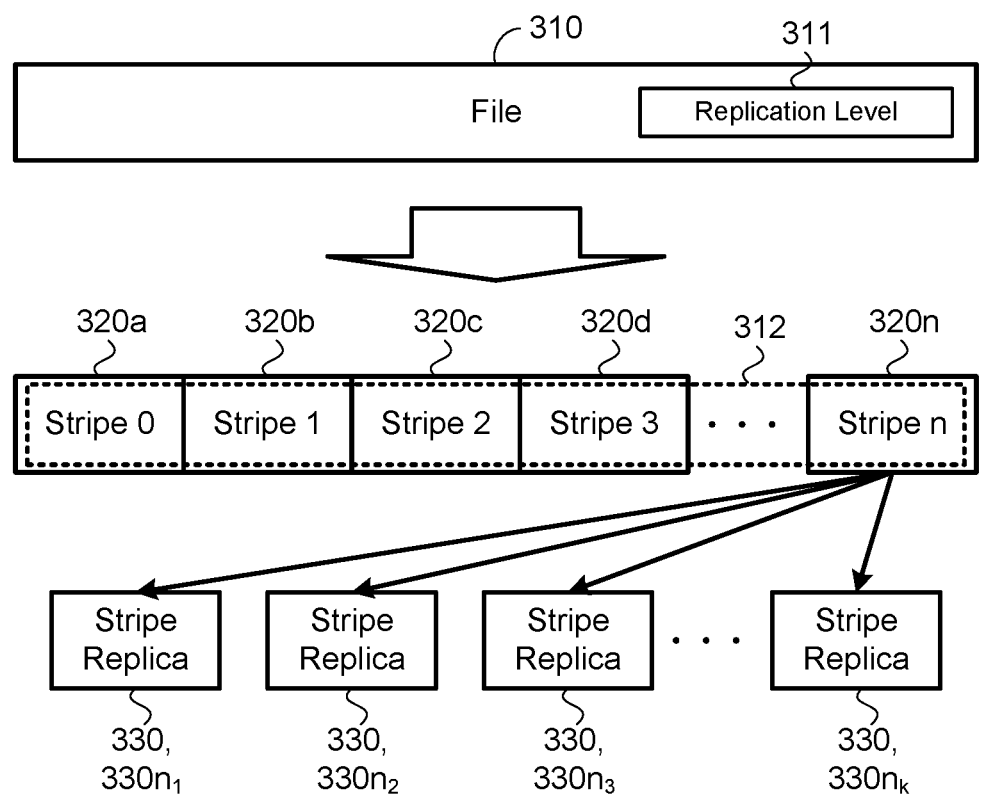
FIG. 3A is a schematic view of an exemplary file split into replicated stripes.
Figure 3B:
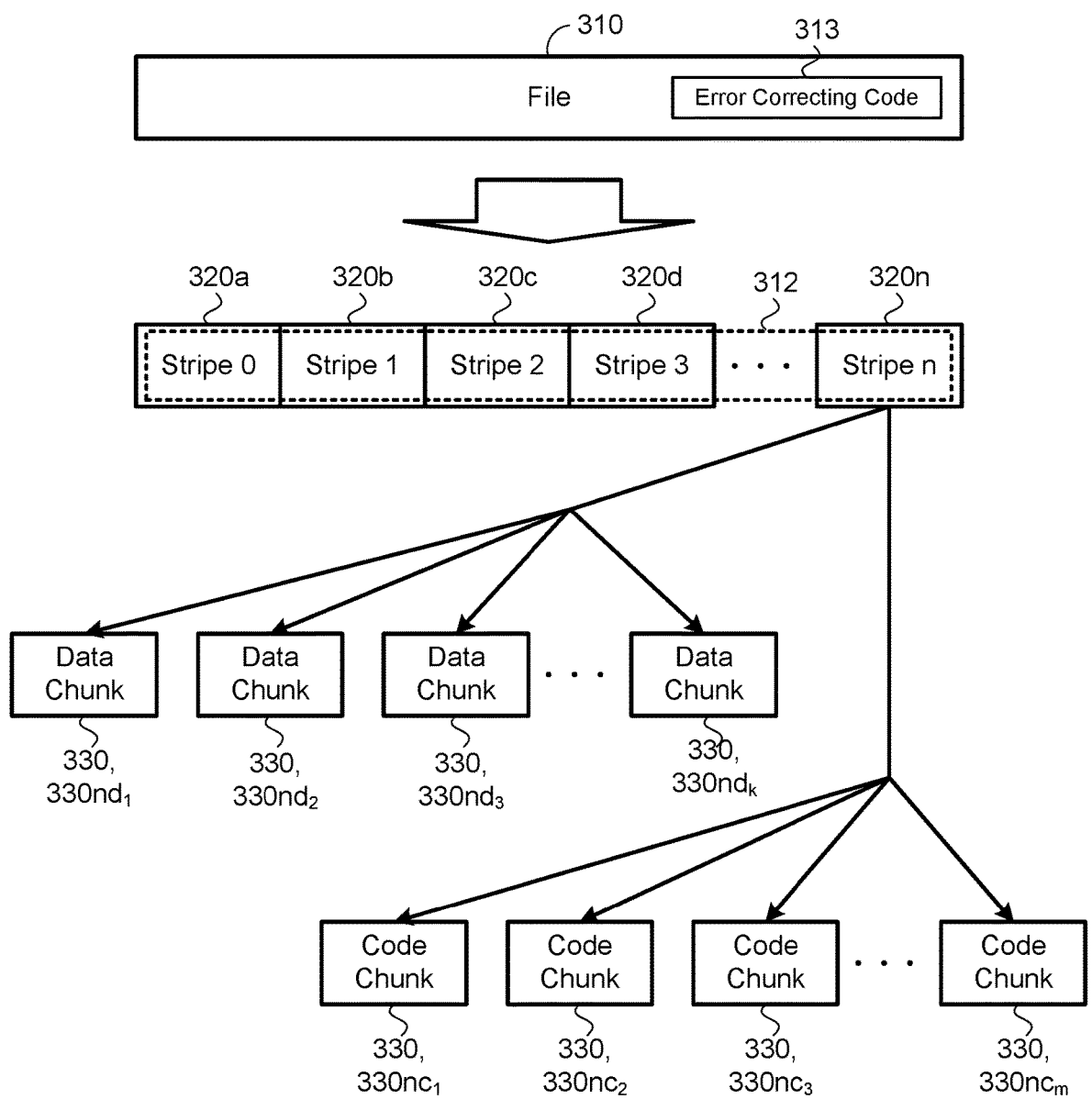
FIG. 3B is a schematic view of an exemplary file split into data chunks and code chunks.

Referring to FIGS. 3A and 3B, data 312 may be one or more files 310, where each file 310 has a specified replication level 311 and/or error-correcting code 313. The curator 210 may divide each file 310 into a collection of stripes 320a-n, with each stripe 320a-n being replicated or encoded independently from the remaining stripes 320a-n. For a replicated file 310, each stripe 320a-n is a single logical chunk that the curator 210 replicates as stripe replicas $330n_k$ and stores on multiple storage resources 114. In that scenario, a stripe replica $330n_k$ is also referred to as a chunk $330n_k$. For an encoded file 310, each stripe 320a-n consists of multiple data chunks $330nd_k$ and code chunks $330nc_m$ that the curator 210 places on multiple storage resources 114, where the collection of data chunks $330nd_k$ and code chunks $330nc_m$ forms a single code word. In general, the curator 210 may place each stripe 320a-n on storage resources 114 independently of how the other stripes 320a-n in the file 310 are placed on storage resources 114. The error-correcting code 313 adds redundant data, or parity data to a file, so that the file can later be recovered by a receiver even when a number of errors (up to the capability of the code being used) were introduced. Error-correcting code is used to maintain data integrity in storage devices, to reconstruct data for performance (latency), or to more quickly drain machines.

Referring back to FIG. 2, in some implementations, file descriptors $300_{1-n}$ stored by the curator 210 contain metadata 212, such as the file map 214, which maps the stripes 320a-n to stripe replicas $320n_k$ or to data chunks $320nd_k$ and code chunks $320nc_m$, as appropriate, stored on the memory hosts 110. To open a file 310, a client 120 sends a request 122 to the curator 210, which returns a file descriptor 300. The client 120 uses the file descriptor 300 to translate file chunk offsets to remote memory locations 115a-n. The file descriptor 300 may include a client key 302 (e.g., a 32-bit key) that is unique to a chunk $320n_k$, $320nd_k$, $320nc_m$ on a memory host 110 and is used to RDMA-read that chunk $320n_k$, $320nd_k$, $320nc_m$. After the client 120 loads the file descriptor 300, the client 120 may access the data 312 of a file 310 via RDMA or another data retrieval method.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying a client 120 to gather latency statistics from a client's point of view. In some examples, the curator 210 uses the memory host status information to make rebalancing, draining, recovery decisions, and allocation decisions.

The curator(s) 210 may allocate chunks 330 in order to handle client requests 122 for more storage space in a file 310 and for rebalancing and recovery. In some examples, the processor 202 replicates chunks $330n_k$ among the storage devices 114 differently than distributing the data chunks $330nd_k$ and the code chunks $330nc_m$ among the storage devices 114. The curator 210 may maintain a load map 216 of memory host load and liveliness. In some implementations, the curator 210 allocates a chunk 330 by generating a list of candidate memory hosts 110 and sends an allocate chunk request to each of the candidate memory hosts 110. If the memory host 110 is overloaded or has no available space, the memory host 110 can deny the request. In this case, the curator 210 selects a different memory host 110. Each curator 210 may continuously scan its designated portion of the file namespace, examining all the metadata 212 every minute or so. The curator 210 may use the file scan to check the integrity of the metadata 212, determine work that needs to be performed, and/or to generate statistics. The file scan may operate concurrently with other operations of the curator 210. The scan itself may not modify the metadata 212, but schedules work to be done by other components of the system and computes statistics.

Figure 4A:
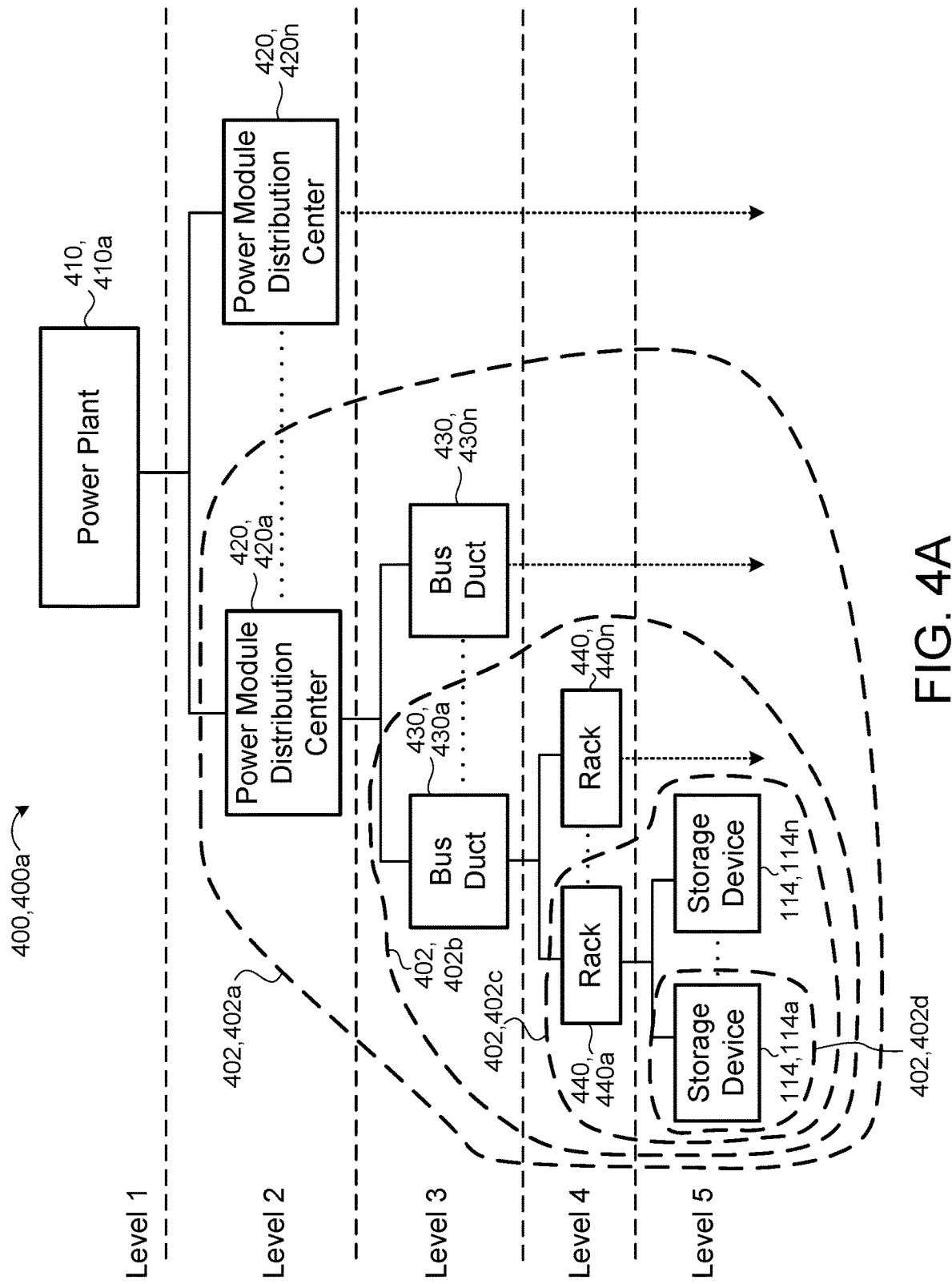
FIGS. 4A-4C are schematic views of an exemplary maintenance hierarchy.
Figure 4B:
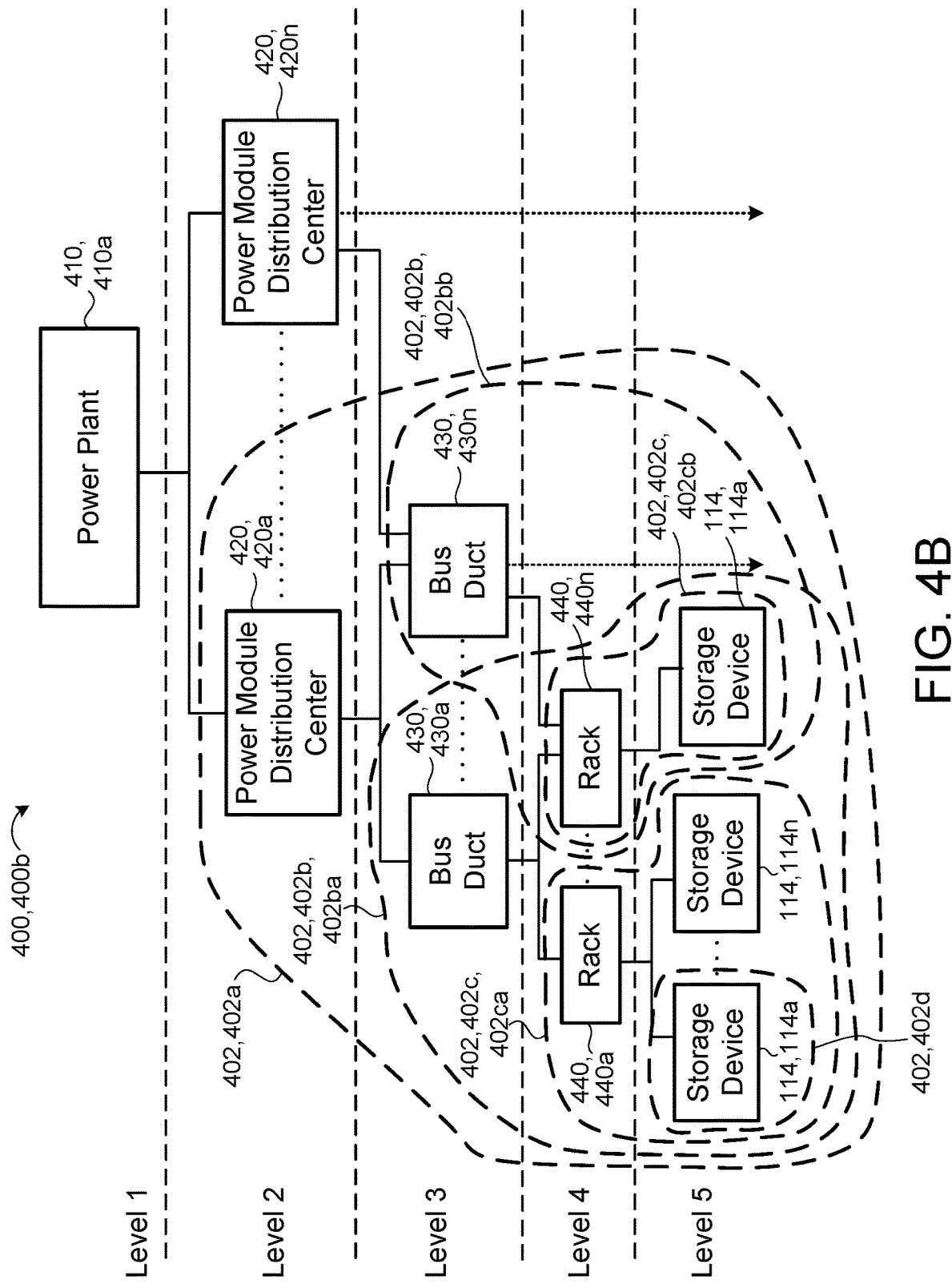
Figure 4C:
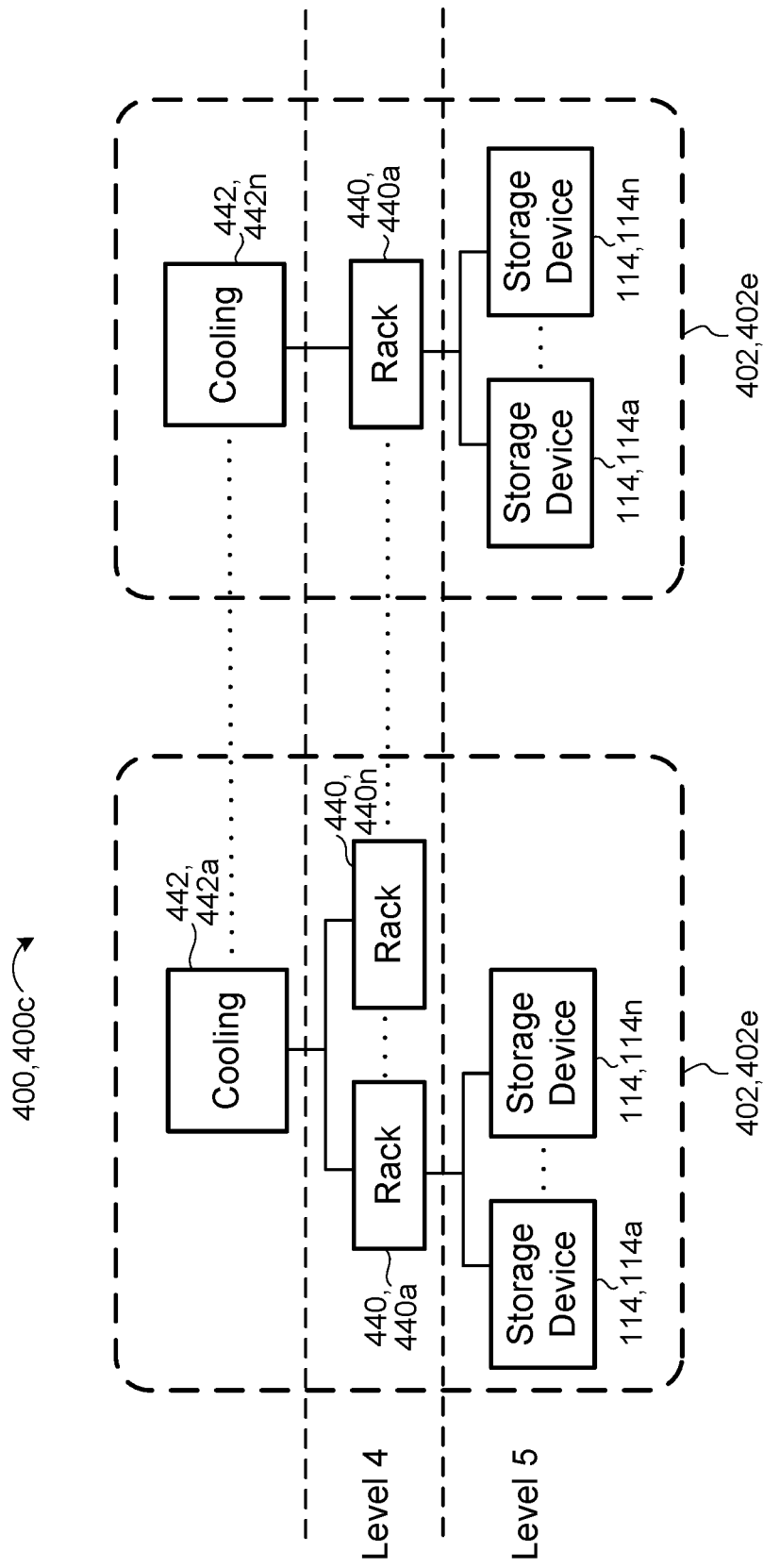

Referring to FIGS. 4A-4C, the curator 210 may determine a maintenance hierarchy 400 of the distributed storage system 100 to identify the levels (e.g., levels 1-5) at which maintenance may occur without affecting a user's access to stored data. Maintenance may include power maintenance, cooling system maintenance (FIG. 4C), networking maintenance, updating or replacing parts, or other maintenance or power outage affecting the distributed storage system 100.

The maintenance hierarchy 400 identifies levels (e.g., levels 1-5) of maintenance units 402, where each maintenance unit 402 may be in an active state or an inactive state. Each storage device 114 of the distributed storage system 100 is associated with one or more maintenance unit 402. Moreover, the processor 202 maps the association of the storage devices 114 with the maintenance units 402 and their components 410, 420, 430, 440, 114. FIG. 4A shows a strict hierarchy 400a where each component 410, 420, 430, 440, 114, depends on one other component 410, 420, 430, 440, 114. While FIG. 4B does shows a non-strict hierarchy 400b where one component 410, 420, 430, 440, 114 has more than one input feed. In some examples, the processor 202 stores the maintenance hierarchy 400 on the non-transitory memory 204 of the processor 202. For example, storage resource 114a is mapped to a rack 440a, which is mapped to a bus duct 430a, which in turn is mapped to a power module distribution center 420a, which in turn is mapped to a power plant 410a. The processor 202 determines, based on the mappings of the components 410, 420, 430, 440, 114, what storage devices 114 are inactive when a component 410, 420, 430, 440, 114 is undergoing maintenance. Once the system 100 maps the maintenance units 402 to the storage resources 114, the system 100 determines a highest level (e.g., levels 1-5) at which maintenance can be performed while maintaining data availability.

A maintenance unit 402 includes a component 410, 420, 430, 440, 114 undergoing maintenance and any components depending from that component 410, 420, 430, 440, 114.

Therefore, when one component 410, 420, 430, 440, 114 is undergoing maintenance, that component 410, 420, 430, 440, 114 is inactive and any component 410, 420, 430, 440, 114 in the maintenance unit 402 of the component 410, 420, 430, 440, 114 is also inactive. As shown in FIG. 4, level 1 components may be the power plants 410 providing power to levels 2 to 5 components; level 2 components may include power module distribution centers 420a-420n; level 3 components may include bus ducts 430a-n; level 4 components may include racks 440a-n; and level 5 components may include the storage resource 114a-n. Other component distribution may also be available. When the power plant 410 is undergoing maintenance, a level 1 maintenance unit 402 including any power module distribution centers 420, bus ducts 430, racks 440, and storage devices 114 depending on the power plant 410 are inactive, and therefore a user cannot access data located within the level 1 maintenance unit. When a power module distribution center 420a is undergoing maintenance, a level 2 maintenance unit 402a that includes the power module distribution center 420a and any components in levels 3 to 5 depending from the power module distribution center 420a are in an inactive state. When a bus duct 430a is undergoing maintenance, a level 3 maintenance unit 402b that includes the bus duct 430a and any components in levels 4 and 5 that depend from the bus duct 430a are in an inactive state. When a rack 440a is underdoing maintenance, a level 4 maintenance unit 402 that includes the rack 440a and storage devices 114 depending from the rack 440a are in an inactive state. Finally, when a storage device 114a is undergoing maintenance, a level 5 maintenance unit 402d includes the storage device 114 and that storage device is inactive.

In some examples, as shown in FIG. 4B, a non-strict hierarchy 400b component 410, 420, 430, 440, 114 may have dual feeds, i.e., the component 410, 420, 430, 440, 114 depends on two or more other components 410, 420, 430, 440, 114. For example, a bus duct 430n may have a feed from two power modules 420; and/or a rack 440 may have a dual feed from two bus ducts 430. As shown, a first maintenance unit 402b may include two racks 440a and 440n, where the second rack 440n includes two feeds from two bus ducts 430a, 430n. Therefore, the second rack 440n is part of two maintenance units 402ba and 402bb. Therefore, the higher levels of the maintenance hierarchy 400 are maintained without causing the loss of the lower levels of the maintenance hierarchy 400. This causes a redundancy in the system which allows the for data accessibility. In particular, the power module distribution center 420 may be maintained without losing any of the bus ducts 430 depending from it. In some examples, the racks 440 include a dual-powered rack that allows the maintenance of the bus duct 430 without losing power to the dual-powered racks 440 depending from it. In some examples, maintenance units 402 that may be maintained without causing outages are ignored when distributing chunks 330 to allow for maintenance; however, the ignored maintenance units 402 may be included when distributing the chunks 330 since an unplanned outage may still cause the loss of chunks 330.

In some examples, the maintenance hierarchy 400 is a cooling hierarchy 400c (or may be a combination of a power hierarchy 400a, 400b) and a cooling hierarchy 400c. The cooling hierarchy 400c maps a cooling device 442 to the racks 440 that it is cooling. As shown, a cooling device 442 may cool one or more racks 440. The processor 202 stores the association of the storage devices 114 with the cooling maintenance units 402. In some implementations, the processor 202 considers all possible combinations of maintenance that might occur within the storage system 100 to determine a hierarchy 400 or a combination of hierarchies 400a, 400b, 400c.

Therefore, when a component 410, 420, 430, 440, 114 in the storage system 100 is being maintained, that component 410, 420, 430, 440, 114 and any components 410, 420, 430, 440, 114 that are mapped to or depending from that component 410, 420, 430, 440, 114 are in an inactive state. A component 410, 420, 430, 440, 114 in an inactive state is inaccessible by a user, while a component 410, 420, 430, 440, 114 in an active state is accessible by a user allowing a user to access data stored on that component 410, 420, 430, 440, 114 or on a storage device 114 mapped to that component 410, 420, 430, 440, 114. As previously mentioned, during the inactive state, a user is incapable of accessing the storage devices 114 associated with the maintenance units 402 undergoing maintenance; and therefore, the user is incapable of accessing the files (i.e., chunks 330, which including stripe replicas $330n_k$ and data chunks $330nd_k$ and code chunks $330nc_m$).

In some implementations, the processor 202 restricts a number of chunks 330 distributed to storage devices 114 of any one maintenance unit 402, e.g., based on the mapping of the components 410, 420, 430, 440, 114. Therefore, if a level 1 maintenance unit 402 is inactive, the processor 202 maintains accessibility to the file 310 (or stripe 320) although some chunks 330 may be inaccessible. In some examples, for each file 310 (or stripe 320), the processor 202 determines a maximum number of chunks 330 that may be placed within any storage device 114 within a single maintenance unit 402, so that if a maintenance unit 402 associated with the storage device 114 storing chunks 330 for a file 310 is undergoing maintenance, the processor 202 may still retrieve the file 310. The maximum number of chunks 330 ensures that the processor 202 is capable of reconstructing the file 310 although some chunks 330 may be unavailable. In some examples, the maximum number of chunks 330 is set to a lower threshold to accommodate for any system failures, while still being capable of reconstructing the file 310 from the chunks 330. When the processor 202 places chunks 330 on the storage devices 114, the processor 202 ensures that within a stripe 320, no more than the maximum number of chunks 330 are inactive when a single maintenance unit 402 undergoes maintenance.

Referring to FIGS. 5-7B, in some implementations, the processor 202 determines a distribution of the chunks 330 among the storage devices 114. In some examples, the processor 202 makes a first random selection 150 of storage devices 114 from an available pool of storage devices 140 to store the chunks 330 of a file 310. The processor 202 selects a number of storage devices 114 (e.g., selected storage device 114S) equal to the number of chunks 330 in a stripe 320. Next, the processor 202 determines if the selection 150 of selected storage devices 114S is capable of maintaining accessibility of the file 310 (i.e., the chunks 330 of the file 310 are available) when one or more (or a threshold number of) maintenance units 402 are in an inactive state. The random selection 150 has the goal of allowing reconstruction of the stripe 320 if maintenance occurs on one of the maintenance components 410, 420, 430, 440, 114.

Figure 5A:
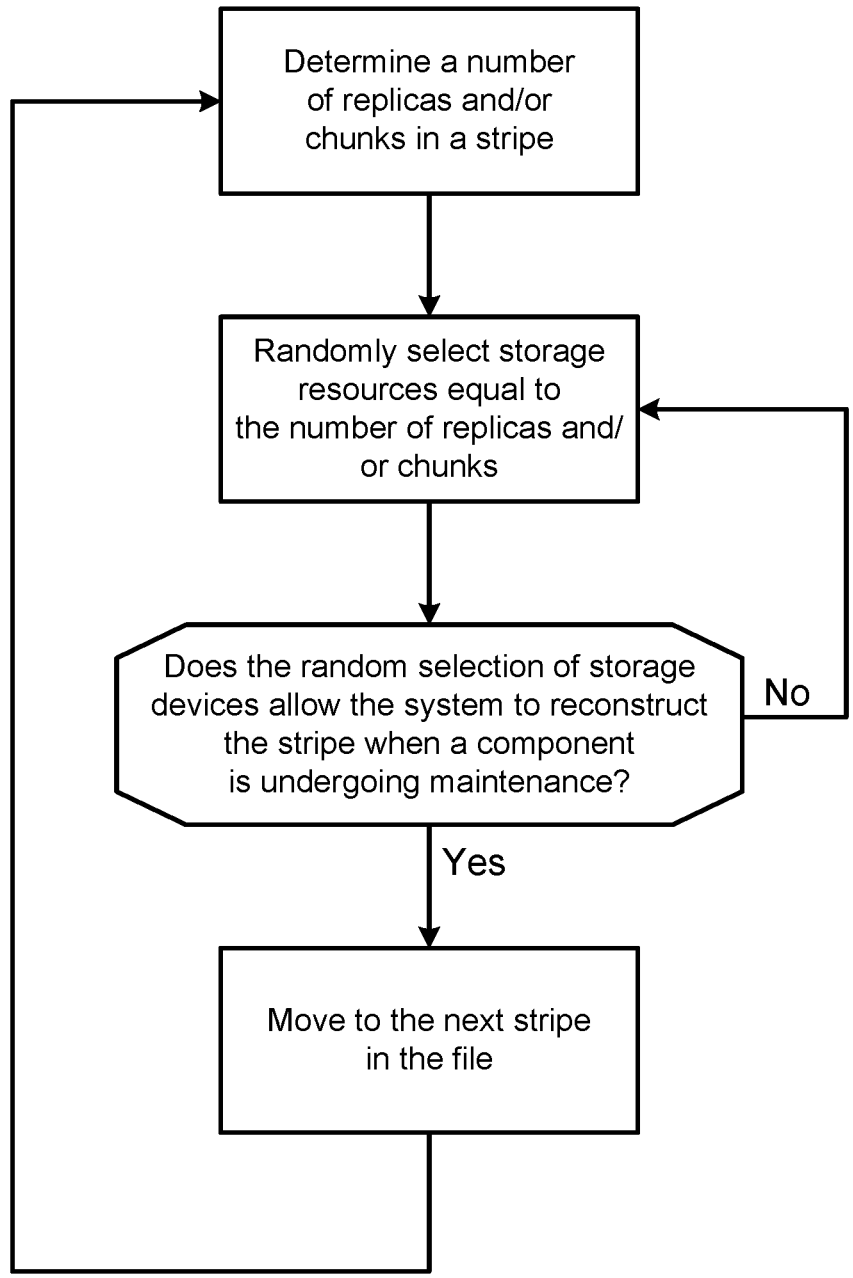
FIG. 5A is a flow chart of an exemplary arrangement of operations for randomly selecting a group of storage resources.
Figure 5B:
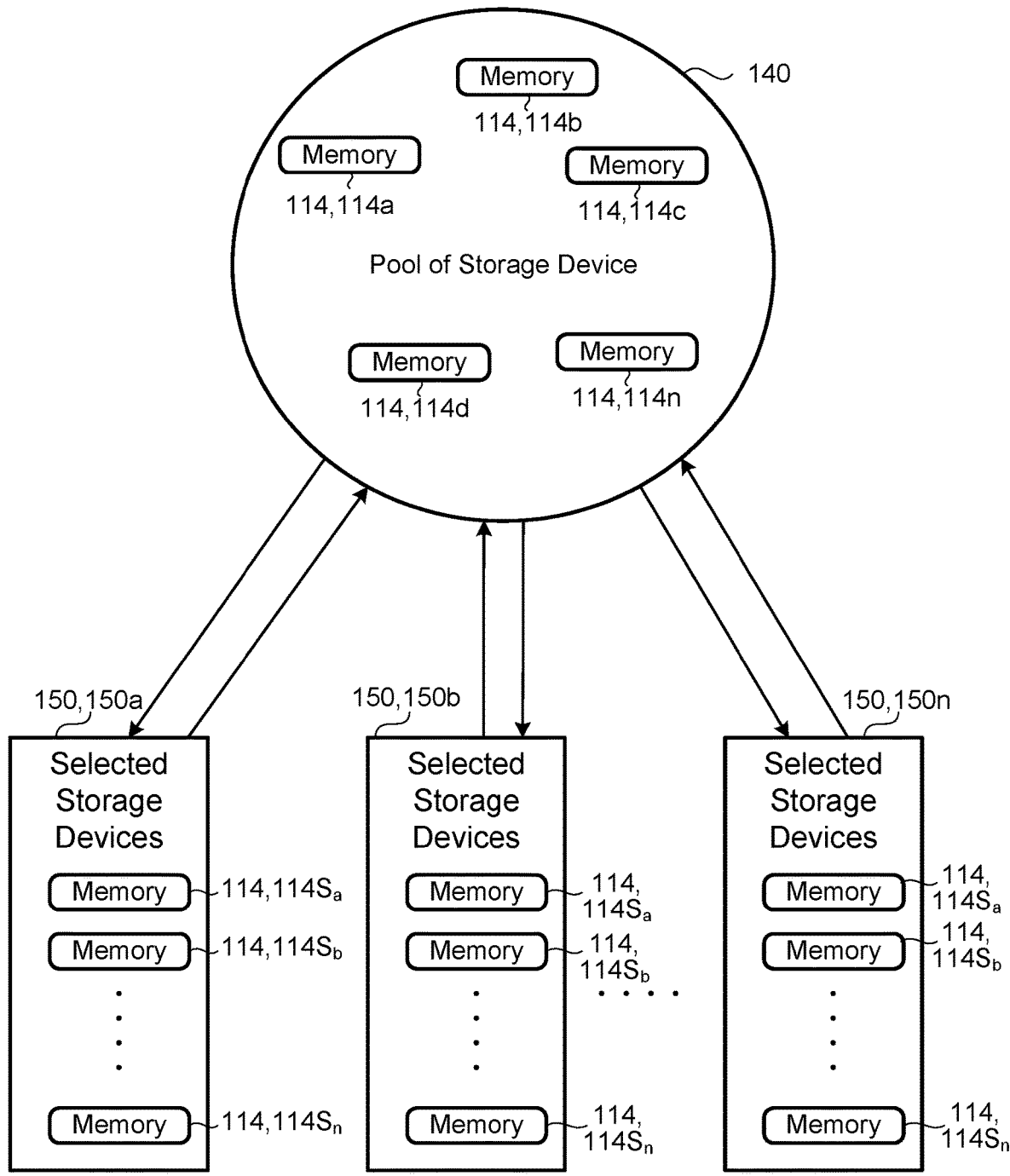
FIG. 5B is a schematic view of an exemplary random selection of storage devices.

Referring to FIGS. 5A and 5B, in some examples, when the processor 202 determines that the first random selection 150a of selected storage devices 114S is incapable of maintaining accessibility of the file 310 when one or more (or a threshold number of) maintenance units 402 are in an inactive state, the processor 202 determines a second random selection 150b of selected storage devices 114S that matches the number of chunks 330 of the file 310. Then, the processor 202 determines if the second random selection 150b of selected storage devices 114S is capable of maintaining accessibility of the file 310 when one or more (or a threshold number of) maintenance units 402 are in an inactive state. If the processor 202 determines that the second random selection 150b is incapable of maintaining accessibility of the file 310 when one or more (or a threshold number of) maintenance units 402 are in an inactive state, the processor 202 continues to make random selections 150n of selected storage devices 114S until the processor 202 identifies a random selection 150n of selected storage devices 114S that is capable of maintaining accessibility of the file 310.

Figure 6A:
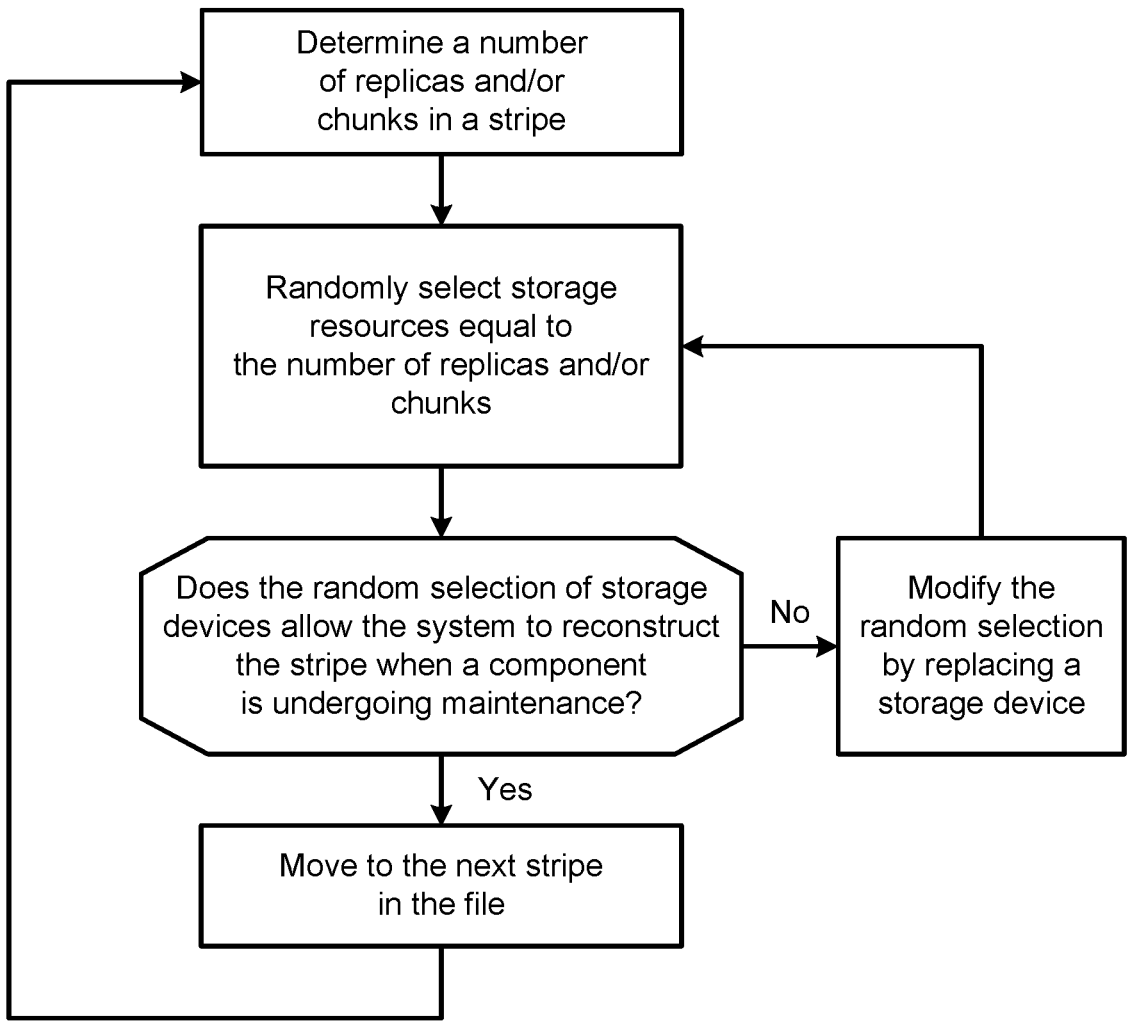
FIG. 6A is a flow chart of an exemplary arrangement of operations for randomly selecting a group of storage resources then randomly updating storage devices within the group.
Figure 6B:
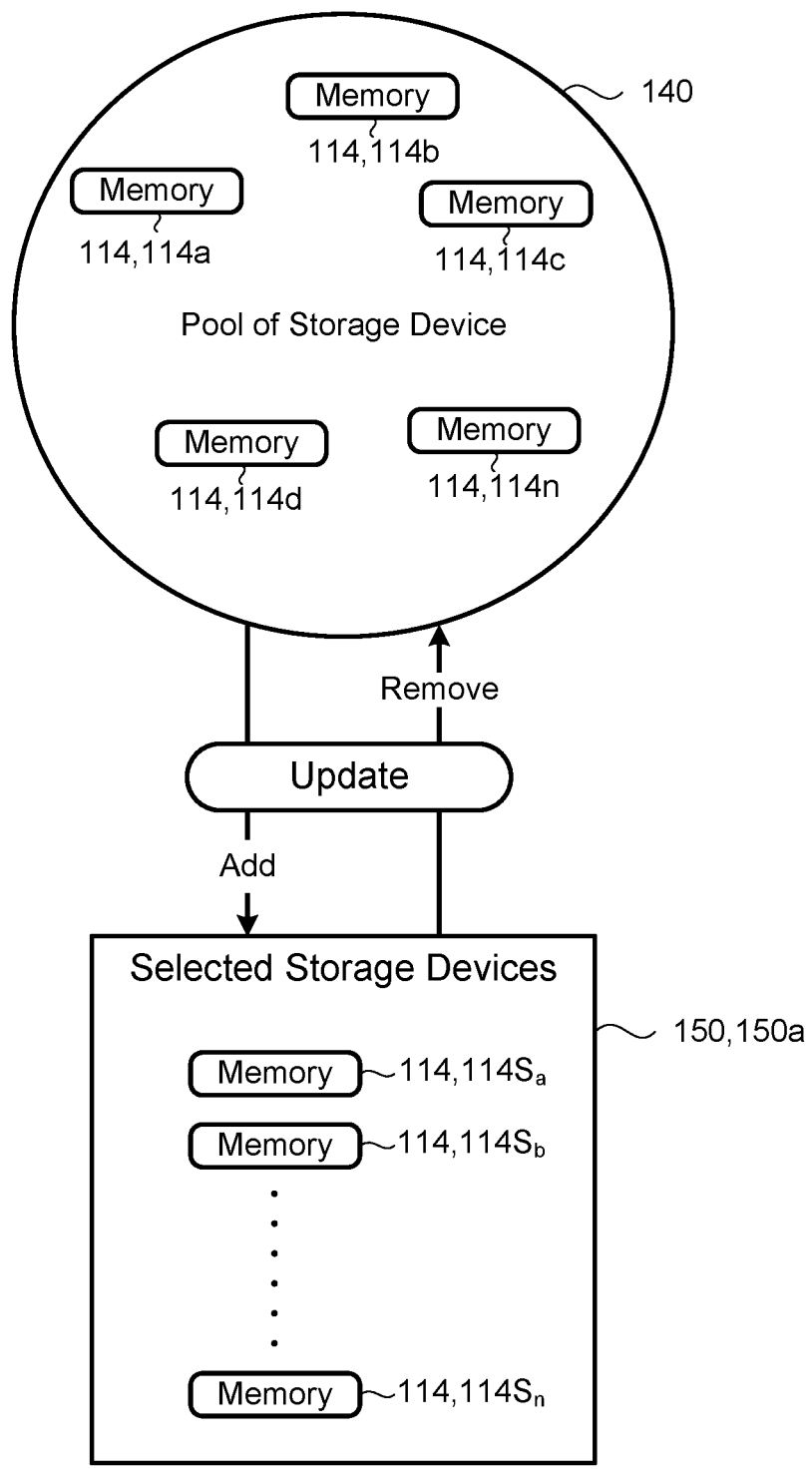
FIG. 6B is a schematic view of an exemplary random selection of storage devices.

Referring to FIGS. 6A and 6B, in some implementations, when the processor 202 determines that the first random 150a selection of selected storage devices 114S is incapable of maintaining accessibility of the file 310 when one or more (or a threshold number of) maintenance units 402 are in an inactive state, the processor 202 modifies the first random selection 150a of selected storage devices 114S by adding one or more randomly selected storage device 114S and removing a corresponding number of different storage devices 114S. The processor 202 then determines if the updated first random selection 150a is capable of maintaining accessibility of the file 310 when one or more (or a threshold number of) maintenance units 402 are in an inactive state. If the processor 202 determines that updated first random selection 150a is incapable of maintaining accessibility of the stripe 320 when one or more (or a threshold number of) maintenance units 402 are in an inactive state, the processor 202 updates the selection 150a of selected storage devices 114S by adding and removing one or more randomly selected storage device 114S. The processor 202 continues to update the random selection 150a of storage devices 114 until the processor 202 determines that the selected storage devices 114S are capable of maintaining accessibility of the stripe 320 during maintenance of the distributed storage system 100. Once the processor 202 makes that determination, the processor 202 moves to the next stripe 320 (or file 310) to determine a distribution of the next stripe 320.

In some implementations, the processor 202 determines the random selection 150 of selected storage devices 114S by using a probability sampling, a simple sampling, a stratified sampling, a cluster sampling, or a combination therefrom. In probability sampling, every unit in a population has a chance greater than zero of being selected in the sample, and this probability can be accurately determined. Probability sampling provides an unbiased estimate of population totals by weighing sampled units according to their probability selection. In a simple random sampling (SRS) of a given number of samples, all subsets of a sampling frame are given an equal probability. In addition, any given pair of elements has the same chance of selection as any other such pair (and similarly for triples, quadruplets, etc.). SRS minimizes bias and simplifies analysis of the results. The variance between the results within the sample is a good indicator of variance in the population, making it easier to estimate the accuracy of the results. In stratified sampling, the population includes a number of distinct categories, where the frame is organized by these categories into separate "strata". Each stratum is sampled as an independent sub-population, out of which individual elements are randomly selected. Stratified sampling has several advantages over other sampling methods. Stratified sampling focuses on important subpopulations and ignores irrelevant ones, it allows the use of different sampling techniques for different subpopulations, improves the accuracy and efficiency of estimation, and permits greater balancing of statistical power of tests of differences between strata by sampling equal numbers from strata that vary greatly in size. Cluster sampling allows the selection of respondents in clusters grouped by geography or by time periods. Cluster sampling does not require a sampling frame that lists all elements in the target population; rather, clusters can be chosen from a cluster level frame with an element-level frame created only for the selected clusters.

Figure 7A:
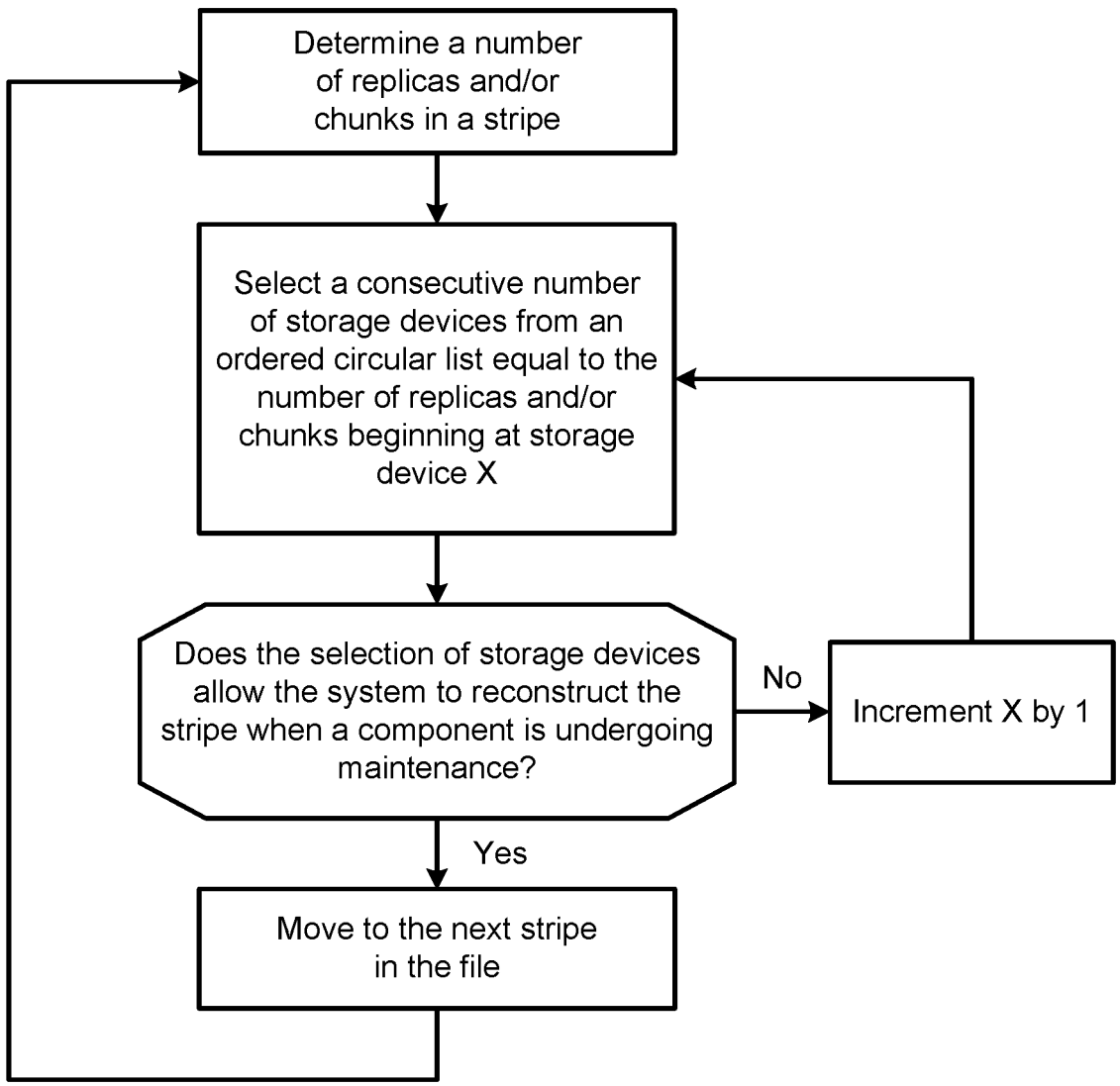
FIG. 7A is a flow chart of an exemplary arrangement of operations for selecting a group of storage resources from a circular list.
Figure 7B:
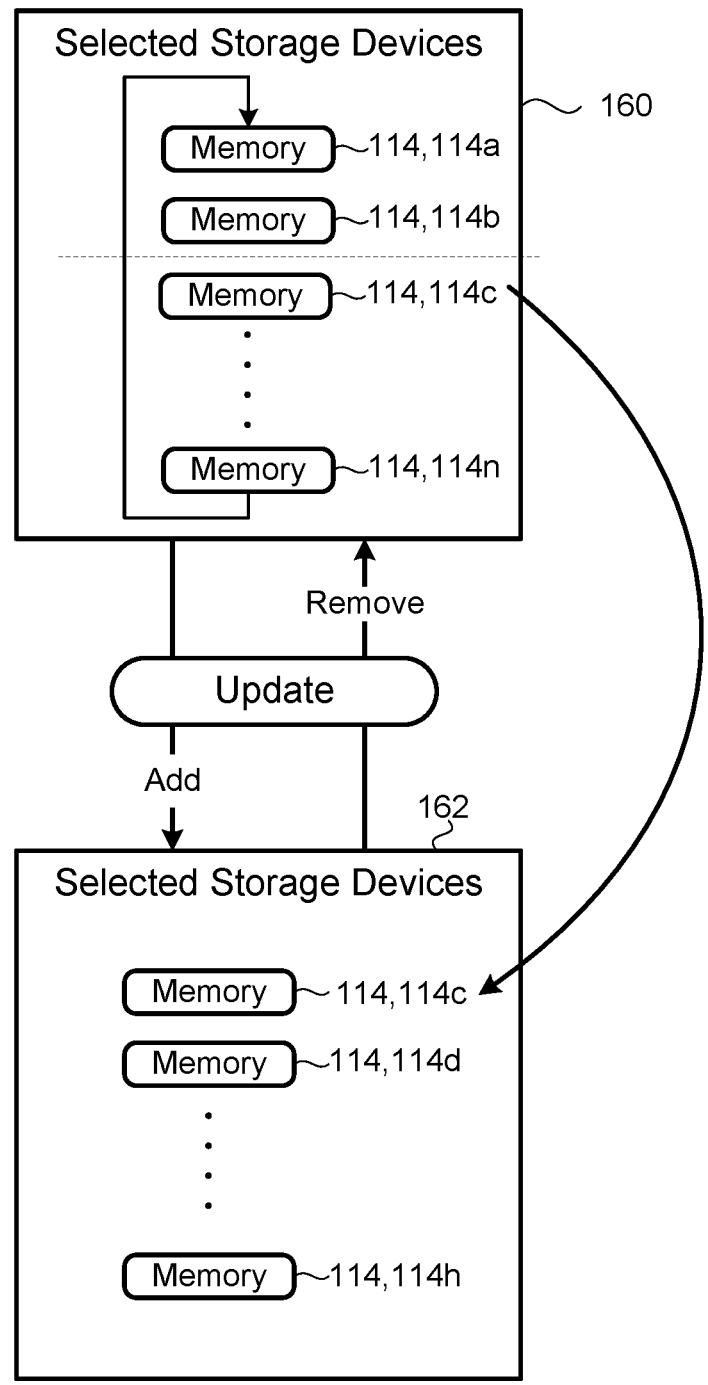
FIG. 7B is a schematic view of an exemplary selection of storage devices from an ordered list.

Referring to FIGS. 7A and 7B, in some implementations, the processor 202 determines a number of chunks 330 in a stipe 320. The processor 220 then selects a selected list 162 having a consecutive number of storage devices 114a-n equal to a number of chunks 330 of the file from an ordered circular list 160 of storage devices 114 of the distributed storage system 100, the ordered circular list 160 beginning at a first storage device 114a. The list 160 may be stored on the non-transitory memory 204 of the processor 202. The processor 202 then determines if the selected storage devices 114a-n from the selected list 162 are collectively incapable of maintaining accessibility of the file 310 (i.e., stripe 320) when one or more (or a threshold number of) maintenance units 402 are in an inactive state. If the processor 202 determines that the selected storage devices 114a-n are collectively incapable of maintaining the accessibility of the file 310 (or stripe 320) when one or more (or a threshold number of) maintenance units 402 are in an inactive state, the processor 202 selects another selected list 162 having consecutive number of storage devices 114a-n from the ordered circular list 160 equal to the number of chunks 330 of the stripe 320 or file 310. In some examples, the processor 202 moves to a second storage device 114(n+1) after the first storage device 114n in the ordered circular list 160 when the processor 202 determines that storage devices 114a-n of the selected list 162 are collectively incapable of maintaining the accessibility of the file 310 (or stripe 320). In other examples, the processor 202 moves a predetermined number of positions down the ordered circular list 160. In some implementations, the processor 202 determines the ordered circular list 160 of storage devices 114 of the storage system 100 where adjacent storage devices 114 or a threshold number of consecutive storage devices 114 on the ordered circular list are associated with different maintenance units 402. Additionally or alternatively, the processor 202 determines the ordered circular list 160 of storage devices 114 of the storage system 100 where adjacent storage devices 114 or a threshold number of consecutive storage devices 114 on the ordered circular list 160 is each in different geographical locations. In some examples, the storage devices 114 on the ordered circular list 160 are arranged so that different maintenance units 402 cause the dispersion of data sequentially along the ordered list 160. For example, as shown in FIG. 4A, the list may not contain sequentially storage devices 114 dependent from the same bust duct 430a. Instead, two sequential storage devices 114 on the list 160 are from different maintenance units 402 to make sure that data accessibility is maintained.

Figure 8:
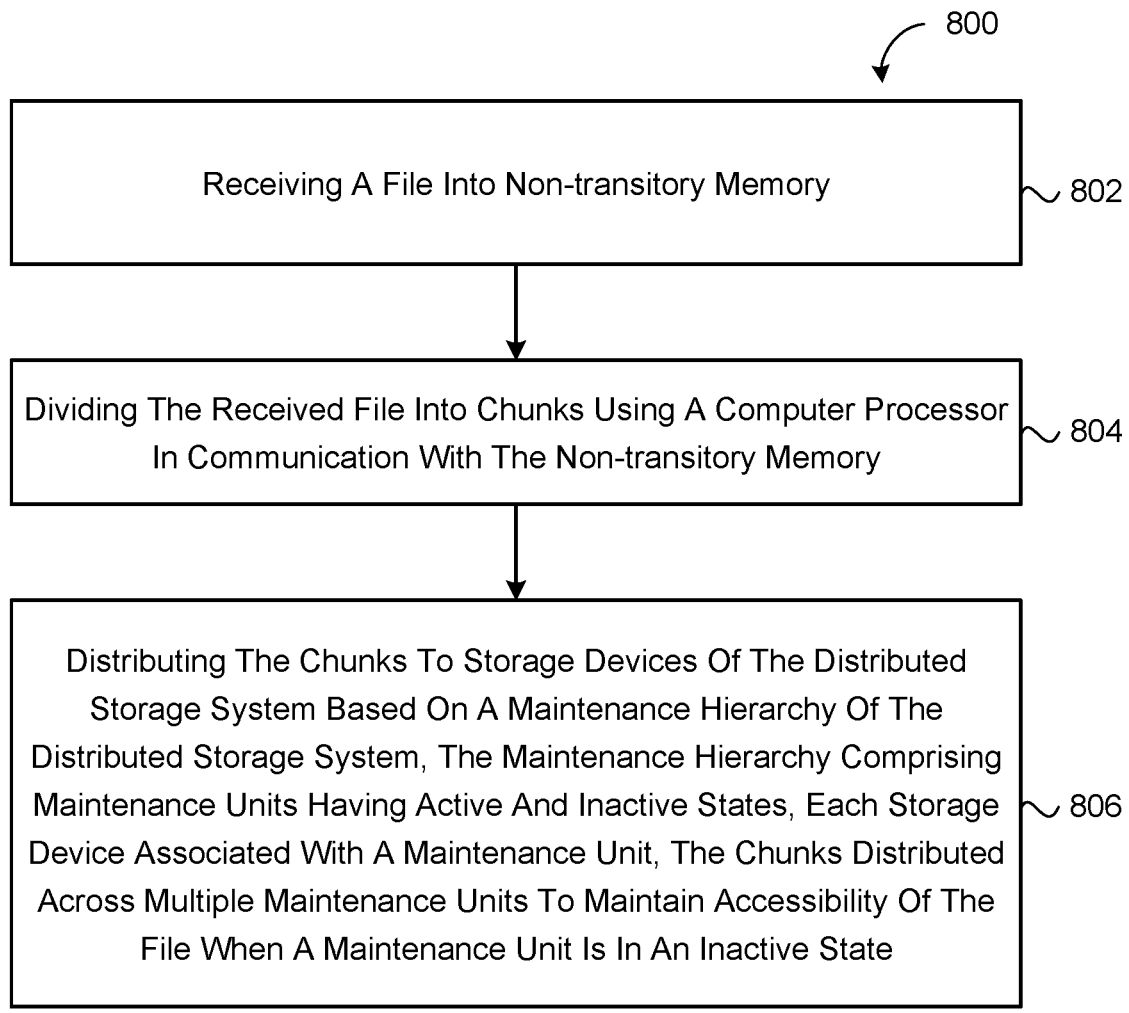
FIG. 8 is a schematic view of an exemplary arrangement of operations for distributing data in a storage system.

Referring to FIG. 8, in some implementations, a method 800 of distributing data in a distributed storage system includes receiving 802 a file 310 into non-transitory memory 204 and dividing 804 the received file 310 into chunks 330 using a computer processor 202 in communication with the non-transitory memory 204. The method 800 also includes distributing chunks 330 to storage devices 114 of the distributed storage system 100 based on a maintenance hierarchy 400 of the distributed storage system 100. The maintenance hierarchy 400 includes maintenance units 402 each having active and inactive states. Moreover, each storage device 114 is associated with a maintenance unit 402. The chunks 330 are distributed across multiple maintenance units 402 to maintain accessibility of the file 310 (or stripe 320) when a maintenance unit 402 is in an inactive state. In some examples, the method 800 includes restricting the number of chunks 330 distributed to storage devices 114 of any one maintenance unit 402.

In some implementations, the method 800 further includes determining a distribution of the chunks 330 among the storage devices 114 by determining a first random selection 150a of selected storage devices 114S that matches a number of chunks 330 of the file 310 and determining if the selection 150a of selected storage devices 114S is capable of maintaining accessibility of the file 310 (or stripe 330) when one or more (or a threshold number of) maintenance units 402 are in an inactive state. In some examples, when the first random selection 150a of selected storage devices 114S is incapable of maintaining accessibility of the file 310 (or stripe 320) when one or more (or a threshold number of) maintenance units 402 are in an inactive state, the method 800 further includes determining a second random selection 150b of selected storage devices 114S that match the number of chunks 330 of the file 310 (or stripe 320), or modifying the first random 150a selection of storage devices 114S by adding and removing one or more randomly selected storage devices 114. The method 800 may further include determining a random selection 150 of storage devices 114 using a simple sampling, a probability sampling, a stratified sampling, or a cluster sampling (previously explained). In some examples, the method 800 determines a third, fourth, fifth . . . etc. random selection of selected storage devices 114S until the selected random selection 150 of storage devices 114 is capable of maintaining accessibility of the file 310 (or stripe 330) when one or more, or a threshold number of maintenance units 402 are in an inactive state.

In some implementations, the method 800 further includes determining a distribution of the chunks 330 among the storage devices 114 by selecting a list 162 having a consecutive number of storage devices 114a-n equal to a number of chunks 330 of the file 310 from an ordered circular list 160 of the storage devices 114 of the distributed storage system 100. When the selected storage devices 114 are collectively incapable of maintaining the accessibility of the file 310 when one or more (or a threshold number of) maintenance units 402 are in an inactive state, the method 800 further includes selecting another list 162 having a consecutive number of storage devices 114a-n from the ordered circular list 160 equal to the number of chunks 330 of the file 310 (or stripe 320). Additionally or alternatively, the method 800 further includes determining the ordered circular list 160 of storage devices 114 of the distributed storage system 100, where adjacent storage devices 114 on the ordered circular list 160 are associated with different maintenance units 402. In some examples, a threshold number of consecutive storage devices 114 on the ordered circular list 160 are each associated with different maintenance units 402 or are each in different geographical locations.

In some implementations, the method 800 further includes determining, the maintenance hierarchy 400 of maintenance units 402 (e.g., using the computer processor 202), where the maintenance hierarchy 400 has maintenance levels (e.g., levels 1-5) and each maintenance level includes one or more maintenance units 402. The method 800 also includes mapping each maintenance unit 402 to at least one storage device 114. Each maintenance unit 402 includes storage devices 114 powered by a single power distribution unit or a single power bus duct 430.

The method 800 may further include dividing the received file 310 into stripes 320a-n. Each file 310 includes a replication code 311 or an error correcting code 313. When the file 310 includes a replication code 311, the method 800 includes replicating at least one stripe 320a-n as replication chunks 330. When the file 310 includes an error correcting code 313, the method 800 includes dividing at least one stripe 320a-n into data chunks $330nd_k$ and code chunks $330nc_m$. The method 800 may also include distributing replication chunks 330 among the storage devices 114 differently than distributing the data chunks $330nd_k$ and the code chunks $330nc_m$ among the storage devices 114.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of distributing data in a distributed storage system, the method comprising:
    receiving a file at data processing hardware;
    dividing, by the data processing hardware, the received file into a number of chunks;
    determining, by the data processing hardware, whether the data processing hardware is capable of reconstructing the file from a set of storage devices of the distributed storage system selected as storage destinations for the number of chunks when at least one storage device in the set of storage devices is inaccessible, the at least one storage device in the set of storage devices is inaccessible when the corresponding at least one storage device is affected by a maintenance event; and
    when the data processing hardware is capable of reconstructing the file from the set of storage devices, distributing, by the data processing hardware, the number of chunks across the set of storage devices of the distributed system to maintain accessibility of the file when the at least one storage device in the set of storage devices is inaccessible.

2. The method of claim 1, further comprising restricting a maximum number of chunks distributed to any one storage device in the set of storage devices.

3. The method of claim 1, wherein the set of storage devices of the distributed storage system are selected as storage destinations for the number of chunks by selecting a number of storage devices matching the number of chunks of the file.

4. The method of claim 3, further comprising, when the data processing hardware is incapable of reconstructing the file from the selected number of storage devices, selecting, by the data processing hardware, another number of storage devices matching the number of chunks of the file.

5. The method of claim 1, further comprising, when the data processing hardware is incapable of reconstructing the file from the set of storage devices, modifying, by the data processing hardware, the set of storage devices by adding and removing one or more storage devices.

6. The method of claim 1, wherein the set of storage devices of the distributed storage system are selected as storage destinations for the number of chunks by using a simple sampling, a probability sampling, a stratified sampling, or a cluster sampling.

7. The method of claim 1, wherein the set of storage devices of the distributed storage system are selected as storage destinations for the number of chunks by selecting a consecutive number of storage devices equal to a number of chunks of the file from an ordered circular list of a plurality of storage devices of the distributed storage system.

8. The method of claim 7, further comprising, when the data processing hardware is incapable of reconstructing the file from the selected number of consecutive storage devices, selecting, by the data processing hardware, another consecutive number of storage devices from the ordered circular list equal to the number of chunks of the file.

9. The method of claim 1, wherein the maintenance event affecting the corresponding at least one storage device in the set of storage devices comprises a power maintenance event or a network maintenance event.

10. The method of claim 1, wherein the corresponding at least one storage device in the set of storage devices is affected by the maintenance event when the corresponding at least one storage device is undergoing maintenance.

11. The method of claim 1, wherein the corresponding at least one storage device in the set of storage devices is affected by the maintenance event when the corresponding at least one storage device depends from a component in the distributed storage system undergoing maintenance.

12. The method of claim 1, wherein dividing the received file into the number of chunks comprises:
    dividing the received file into stripes; and
    creating the number of chunks as stripe replicas by replicating each of the stripes.

13. A system for distributing data in a distributed storage system, the system comprising:
    data processing hardware; and
    memory hardware in communication with the data processing hardware, the memory hardware storing instructions that when executed on the data processing hardware cause the data processing hardware to perform operations comprising:
        receiving a file;
        dividing the received file into a number of chunks;
        determining whether the data processing hardware is capable of reconstructing the file from a set of storage devices of the distributed storage system selected as storage destinations for the number of chunks when at least one storage device in the set of storage devices is inaccessible, the at least one storage device in the set of storage devices is inaccessible when the corresponding at least one storage device is affected by a maintenance event; and
        when the data processing hardware is capable of reconstructing the file from the set of storage devices, distributing the number of chunks across the set of storage devices of the distributed system to maintain accessibility of the file when the at least one storage device in the set of storage devices is inaccessible.

14. The system of claim 13, wherein the operations further comprise restricting a maximum number of chunks distributed to any one storage device in the set of storage devices.

15. The system of claim 13, wherein the set of storage devices of the distributed storage system are selected as storage destinations for the number of chunks by selecting a number of storage devices matching the number of chunks of the file.

16. The system of claim 15, wherein the operations further comprise, when the data processing hardware is incapable of reconstructing the file from the selected number of storage devices, selecting another number of storage devices matching the number of chunks of the file.

17. The system of claim 13, wherein the operations further comprise, when the data processing hardware is incapable of reconstructing the file from the set of storage devices, modifying the set of storage devices by adding and removing one or more storage devices.

18. The system of claim 13, wherein the set of storage devices of the distributed storage system are selected as storage destinations for the number of chunks by using a simple sampling, a probability sampling, a stratified sampling, or a cluster sampling.

19. The system of claim 13, wherein the set of storage devices of the distributed storage system are selected as storage destinations for the number of chunks by selecting a consecutive number of storage devices equal to a number of chunks of the file from an ordered circular list of a plurality of storage devices of the distributed storage system.

20. The system of claim 19, wherein the operations further comprise, when the data processing hardware is incapable of reconstructing the file from the selected number of consecutive storage devices, selecting another consecutive number of storage devices from the ordered circular list equal to the number of chunks of the file.

21. The system of claim 13, wherein the maintenance event affecting the corresponding at least one storage device in the set of storage devices comprises a power maintenance event or a network maintenance event.

22. The system of claim 13, wherein the corresponding at least one storage device in the set of storage devices is affected by the maintenance event when the corresponding at least one storage device is undergoing maintenance.

23. The system of claim 13, wherein the corresponding at least one storage device in the set of storage devices is affected by the maintenance event when the corresponding at least one storage device depends from a component in the distributed storage system undergoing maintenance.

24. The system of claim 13, wherein dividing the received file into the number of chunks comprises:
   dividing the received file into stripes; and
   creating the number of chunks as stripe replicas by replicating each of the stripes.

\* \* \* \* \*